United States Patent [19]

Dauvergne

[11] 4,241,582

[45] Dec. 30, 1980

[54] ASSISTED BRAKING DEVICE

[75] Inventor: Jean L. R. Dauvergne, Survilliers, France

[73] Assignee: Societe Anonyme Francaise du Ferodo, Paris, France

[21] Appl. No.: 954,241

[22] Filed: Oct. 24, 1978

[30] Foreign Application Priority Data

Nov. 4, 1977 [FR] France ............... 77 33168

[51] Int. Cl.$^3$ ............................... B60T 13/20
[52] U.S. Cl. ........................ 60/550; 60/594; 91/391 R
[58] Field of Search .......... 60/547 R, 550, 551, 60/594, 552, 553, 554, 593, 548; 91/391 R, 391 A

[56] References Cited

U.S. PATENT DOCUMENTS

| | | | |
|---|---|---|---|
| 2,323,406 | 7/1943 | Milhaupt | 60/551 |
| 2,372,013 | 3/1945 | Rockwell | 60/551 |
| 2,680,350 | 6/1954 | Sprague | 60/548 |
| 2,846,031 | 8/1958 | Kelley | 60/550 |
| 2,959,450 | 11/1960 | Gladden | 60/551 |
| 3,048,980 | 8/1962 | Cousino | 60/594 |
| 3,093,120 | 6/1963 | Ayers, Jr. | 91/391 A |
| 3,707,075 | 12/1972 | Cripe | 60/550 |
| 3,808,817 | 5/1974 | Bennett | 60/550 |
| 4,024,795 | 5/1977 | Sawyer | 91/391 R |

*Primary Examiner*—Abraham Hershkovitz
*Attorney, Agent, or Firm*—Young & Thompson

[57] ABSTRACT

The device comprises a master piston and cylinder assembly the piston of which is interconnected with the piston of an assisting jack by means of a connecting element on which is articulated the brake lever. The end of the brake lever remote from the brake pedal acts on a distributor adapted to feed the assisting jack with assisting hydraulic pressure so that when a force is applied to the brake pedal and thereby to the master piston via the connecting element, the distributor directs hydraulic fluid under pressure to the assisting jack, the piston of which then applies an assisting force to the connecting element.

In the improvement of the invention, an abutment surface is provided for the brake lever located between the articulation point of the lever and its point of contact with the distributor so as to increase the mechanical advantage of the brake lever in the event of failure of the assisting hydraulic system.

6 Claims, 3 Drawing Figures

ASSISTED BRAKING DEVICE

BACKGROUND OF THE INVENTION

In co-pending U.S. patent application Ser. No. 919,943, an assisted braking device is described which comprises a master piston mounted for sliding in a master cylinder, a jack having a piston connected to the master piston by interconnecting means, a source of assisting hydraulic pressure, and a distributor adapted to supply the jack with assisting hydraulic pressure from the said source and operated in response to the actuation of pilot means comprising a pedal, wherein the pedal is located at one end of a lever which is directly mounted by an articulation on the interconnecting means, the other end of the lever acting on the distributor.

If the assistance should fail, manual intervention can be provided by means of the pedal.

In the aforesaid patent application, this manual intervention is made possible by the abutting of a flange of the slide-valve of the distributor against a bearing surface of the body of the distributor. Consequently, the pedal action occurs with the same reduction ratio whether or not the assistance is defective.

This invention relates to an assisted braking system in which, in the case of the failure of the assistance, manual operation by means of the pedal is effected with a greater reduction ratio, which reduces the pedal load and makes it easier for the user to intervene manually.

SUMMARY

According to the invention, an assisted braking device of the type described hereinbefore is characterised in that an abutment means forming a support for the pedal lever is provided closer to the articulation of the said lever on the interconnecting means than the end of the said lever acting on the distributor, with the result that, if the assistance breaks down, manual intervention is assured by the pedal as it causes the said lever to abut on the said abutment means.

As a result of this arrangement, the manual intervention is effected under excellent gearing-down conditions and also occurs comfortably and hence safely, even if it results in a slight increase in the length of travel of the pedal.

DESCRIPTION OF THE PREFERRED EMBODIMENT

Figure 1:
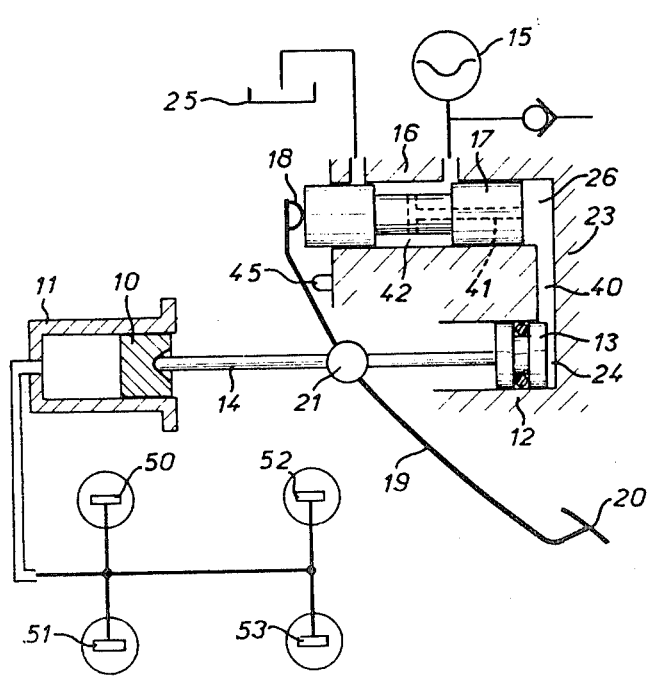
FIG. 1 is a diagrammatic view of an entire braking device according to the invention.
Figure 3:
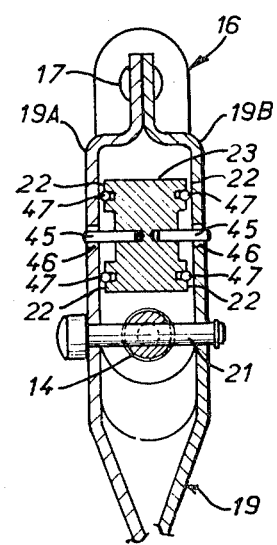
FIG. 3 is a section through the device on the broken line III—III in FIG. 2.
Figure 2:
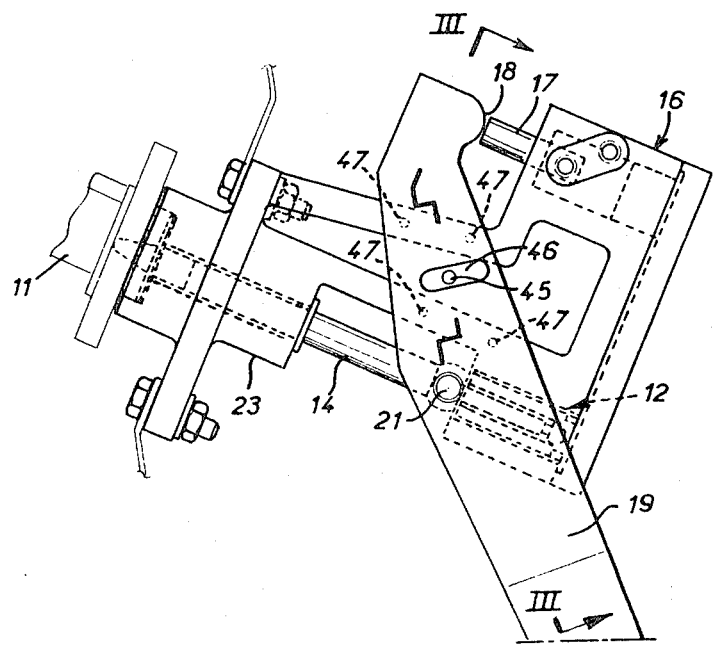
FIG. 2 is a partial view, on an enlarged scale, of this device, in a side elevation.

As a non-restrictive example, the embodiment shown in FIGS. 1 to 3 relates to the use of the invention for the braking of a motor vehicle, as in the co-pending patent application referred to above.

An assisted braking system according to the invention comprises a master piston 10 mounted for sliding in a master cylinder 11. The latter supplies the brakes 50, 51, 52 and 53 of a motor vehicle, preferably via a dual circuit (not shown).

A jack 12 is axially aligned with the master cylinder 11 and comprises a piston 13 which is connected to the master piston 10 by axially aligned interconnecting means 14. In the example shown, these means consist of a rod 14.

The jack 12 has a hydraulic chamber 24 which is defined by the piston 13 and which, when put under pressure, enables the piston to be displaced. The chamber 24 is connected by a conduit 40 to a chamber 26 of a distributor 16, the slide-valve of which is shown at 17. The chamber 26 is defined by the slide-valve 17 at one end of the latter and communicates, via a channel 41 provided in the slide-valve 17, with an intermediate annular groove 42 in the slide-valve 17.

The slide-valve 17 is subjected to two opposing forces, one of which is developed by the end 18 of a pedal lever 19 and tends to push it to the right (in FIG. 1), whilst the other is developed by the hydraulic pressure in the chamber 26 and tends to push it to the left. The annular groove 42 can be made to communicate either with a reservoir 25 or with a source of assisting hydraulic pressure 15, for example a pressure accumulator associated with a pump, depending on the position of the slide-valve 17.

The pedal lever 19 the end 18 of which acts on the slide-valve 17 of the distributor 16 constitutes a pilot means and, at its other end, comprises a brake pedal 20 which is at the disposal of the driver of the vehicle.

Between the ends 18 and 20, the pedal lever 19 is articulated on the interconnecting means 14 about a horizontal spindle 21.

The pedal lever 19 is thus mounted in floating manner by being mounted directly on the rod 14, but it is held in a vertical plane passing through this rod. For this purpose, the lever 19 (FIG. 3) is divided into two spaced planar portions 19A and 19B which are guided so as to slide over two parallel planar bearing surfaces 22 of a body 23. Preferably, this sliding movement is guided by means of steel ball bearings 47 mounted in the body 23. Thus the sliding movement is improved, wear is avoided and there is greater precision, even if the body 23 has large manufacturing tolerances. Thus, for example, the body 23 may be cast, advantageously from aluminum. This body 23 is common to the distributor 16 and the jack 12, and the chambers 24 and 26 merely have to be bored therein. The body 23 is integral with the master cylinder 11.

As long as the pedal 20 is not being pressed down, the end 18 of the lever 19 exerts no thrust on the slide-valve 17. The pressure source 15 is isolated from the chamber 24 of the jack 12, the said chamber communicating with the reservoir 25.

When the pedal 20 is depressed in order to brake, the slide-valve 17 is pushed towards the right of FIG. 1. The chamber 24 is isolated from the reservoir 25. The pressure source 15 is put into communication in modulated manner with this chamber 24, thus pushing the piston 13 to the left in FIG. 1 and at the same time pushing the rod 14 and the master piston 10.

Thus, assisted braking is effected which is precisely controlled by the action of the user on the pedal 20, in a way which is made sensitive by the resistance which the foot detects and which is opposed by the pressure in the chamber 26.

If the brake assistance breaks down, manual intervention using the pedal 20 is provided for.

In the previous patent application this intervention is accomplished by the abutting of a flange of the slide-valve 17 against the body of the distributor 16. Thus, action on the pedal 20 has the effect of pushing directly on the rod 14 at 21, causing the lever to bear against the point 18.

The distance between the points 18 and 21, taking into account the length of the lever 19 between the points 21 and 20, is perfectly suited to normal operation with the assistance system in action, but the ratio of lengths between the points 18, 20 and between the points 18, 21 which defines the lever action or reduction ratio with which the pedal acts directly on the master piston 10, may be inadequate to ensure effective maneuvering and may require excessive effort on the part of the driver who is deprived of the help of the assistance system.

According to the present invention, the point of abutment of the lever 19 for direct manual intervention is designed to be different from the point 18 and closer to the point 21, so that the effort on the pedal is reduced.

For this purpose, according to the present invention, a bearing surface 45 is provided on the body 23 (FIG. 1), on which surface 45 the lever 19 comes to abut when the assistance system is out of commission. The slide-valve 17 has no abutment flange, and there is a space at 26 when the lever 19 reaches the abutment 45. Thus, when operating the pedal 20, the driver benefits from a greater gearing down than with the arm 18, 21, as a result of the shortened arm 45, 21.

In FIG. 1, the abutment 45 is shown as a projection from the body 23.

In fact, it is advantageous to provide the abutment 45 (FIGS. 2 and 3) in the form of two half-spindles which are fitted in the body 23 and protrude on both sides of this body 23, whilst engaging in the openings 46 in the sides 19A and 19B of the lever 19.

As long as there is normal functioning with the assistance system in action, the openings 46 allow the spindle 45 to pass through freely.

If the assistance system is defective, the spindle 45 comes to abut on one end of the openings 46, thus enabling the lever 19 to engage and push the rod 14.

Thus, manual intervention is effected under the best possible conditions.

I claim:

1. In an assisted braking device comprising a master piston mounted for sliding in a master cylinder, a jack having a piston connected to the master piston by interconnecting means, a source of assisting hydraulic pressure, and a distributor adapted to supply the jack with assisting hydraulic pressure from said source and operated in response to the actuation of a pedal located at one end of a lever which is directly mounted by an articulation on said interconnecting means, the other end of the lever acting on said distributor; the improvement comprising abutment means forming a support for the pedal lever closer to said articulation of said lever on said interconnecting means than said end of said lever acting on the distributor, said abutment means being so positioned that, in the case of breakdown of the assistance system, manual intervention is achieved by abutment of the lever against said abutment means.

2. An assisted braking device according to claim 1, wherein the distributor comprises a slide-valve adapted to allow the pedal lever to move into abutment with said abutment means.

3. An assisted braking device according to claim 1, wherein the pedal lever comprises over at least part of its length, two spaced planar parts which are guided in sliding manner on either side of a fixed body, and said abutment means consists of a spindle which is integral with this fixed body and which engages in openings provided in the two planar parts of the pedal lever.

4. An assisted braking device according to claim 3, wherein said spindle consists of two half-spindles fitted in the fixed body.

5. An assisted braking device according to claim 3, wherein the two spaced planar parts of the lever are guided on the fixed body by sliding over ball bearings mounted within said fixed body.

6. An assisted braking device according to claim 1, wherein said lever and abutment means are spaced apart from each other when said pedal is not actuated.

* * * * *